United States Patent
Bossert (10) Patent No.: US 9,188,677 B2
(45) Date of Patent: Nov. 17, 2015

(54) IMAGING DOPPLER LIDAR FOR WIND TURBINE WAKE PROFILING

(71) Applicant: Sandia Corporation, Albuquerque, NM (US)

(72) Inventor: David J. Bossert, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/254,555

(22) Filed: Apr. 16, 2014

(65) Prior Publication Data

US 2014/0327904 A1 Nov. 6, 2014

Related U.S. Application Data

(60) Provisional application No. 61/817,995, filed on May 1, 2013.

(51) Int. Cl.
| | |
|---|---|
| *G01S 17/95* | (2006.01) |
| *G01P 5/26* | (2006.01) |
| *G01S 17/10* | (2006.01) |
| *G01S 17/58* | (2006.01) |
| *G01S 17/89* | (2006.01) |
| *G01S 7/481* | (2006.01) |

(52) U.S. Cl.
CPC . *G01S 17/95* (2013.01); *G01P 5/26* (2013.01); *G01S 7/4816* (2013.01); *G01S 17/107* (2013.01); *G01S 17/58* (2013.01); *G01S 17/89* (2013.01)

(58) Field of Classification Search
CPC ....... G01S 7/003; G01S 13/953; G01S 13/95; G01C 3/08
USPC ................................ 356/3.01–28.5
See application file for complete search history.

(56) References Cited

U.S. PATENT DOCUMENTS

| | | | | |
|---|---|---|---|---|
| 5,237,331 A | * | 8/1993 | Henderson et al. | 342/54 |
| 2005/0100336 A1 | * | 5/2005 | Mendenhall et al. | 398/27 |
| 2013/0314694 A1 | * | 11/2013 | Tchoryk et al. | 356/28.5 |

* cited by examiner

*Primary Examiner* — Luke Ratcliffe
(74) *Attorney, Agent, or Firm* — Kevin W. Bieg (57) ABSTRACT

An imaging Doppler lidar (IDL) enables the measurement of the velocity distribution of a large volume, in parallel, and at high spatial resolution in the wake of a wind turbine. Because the IDL is non-scanning, it can be orders of magnitude faster than conventional coherent lidar approaches. Scattering can be obtained from naturally occurring aerosol particles. Furthermore, the wind velocity can be measured directly from Doppler shifts of the laser light, so the measurement can be accomplished at large standoff and at wide fields-of-view.

14 Claims, 8 Drawing Sheets

Image Ratio:

$$\Gamma(x,y,\nu) = \frac{N_s(x,y) - N_{d,s}}{N_r(x,y) - N_{d,r}}$$

Doppler Frequency Shift:

$$\Delta\nu_D = \frac{T(\nu_U)}{\frac{dT}{d\nu}} \left( \frac{\Gamma(x,y,\nu_L + \Delta\nu_D) - \Gamma(x,y,\nu_B)}{\Gamma(x,y,\nu_U)} - \frac{\gamma_R(\nu_L) - \gamma_R(\nu_B)}{\gamma_R(\nu_U)} \right)$$

IMAGING DOPPLER LIDAR FOR WIND TURBINE WAKE PROFILING

CROSS-REFERENCE TO RELATED APPLICATION

This application claims the benefit of U.S. Provisional Application No. 61/817,995, filed May 1, 2013, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to wind velocity measurements and, in particular, to an imaging Doppler lidar for wind velocity profiling in a wind turbine wake.

BACKGROUND OF THE INVENTION

Wind energy applications require accurate measurement of wind speed and turbulence. For example, optimizing the design and operation of wind farms requires understanding the complex interaction between atmospheric boundary layer flow and wind turbines. In particular, understanding wind turbine wakes is important for optimizing power output and minimizing fatigue loads on the turbine blades, especially within wind farms.

Wind measurements for wind energy applications have been obtained mainly with cup anemometers. However, cup anemometers cannot measure wind direction and require the erection of tall towers that can disturb wake flow. Therefore, there is a need for remote sensing instruments that can perform wind speed measurements without affecting the flow. Light detection and ranging (lidar) systems are now being deployed to measure the velocity of the inflow and the wake of wind turbines.

A Doppler lidar is a remote sensing instrument that measures wind velocity through the evaluation of the Doppler shift of a laser beam emitted into the atmosphere and backscattered from aerosol particles (e.g., dust, droplets) in the atmosphere. The Doppler lidar measures the velocity component along the line-of-sight of the laser beam, derived from the frequency difference between the emitted and backscattered signals. This is often done coherently, by observing the heterodyne signal between the laser light and what is returned from the aerosol. Velocity measurements at locations along the beam can be performed by simply staring the beam along a fixed direction. Alternatively, a two-dimensional measurement can be performed by raster scanning a highly collimated laser beam over the scene of interest. The range or distance at which the measurement is made can be controlled by focusing the laser beam or from the signal round-trip time-of-flight.

Figure 1:
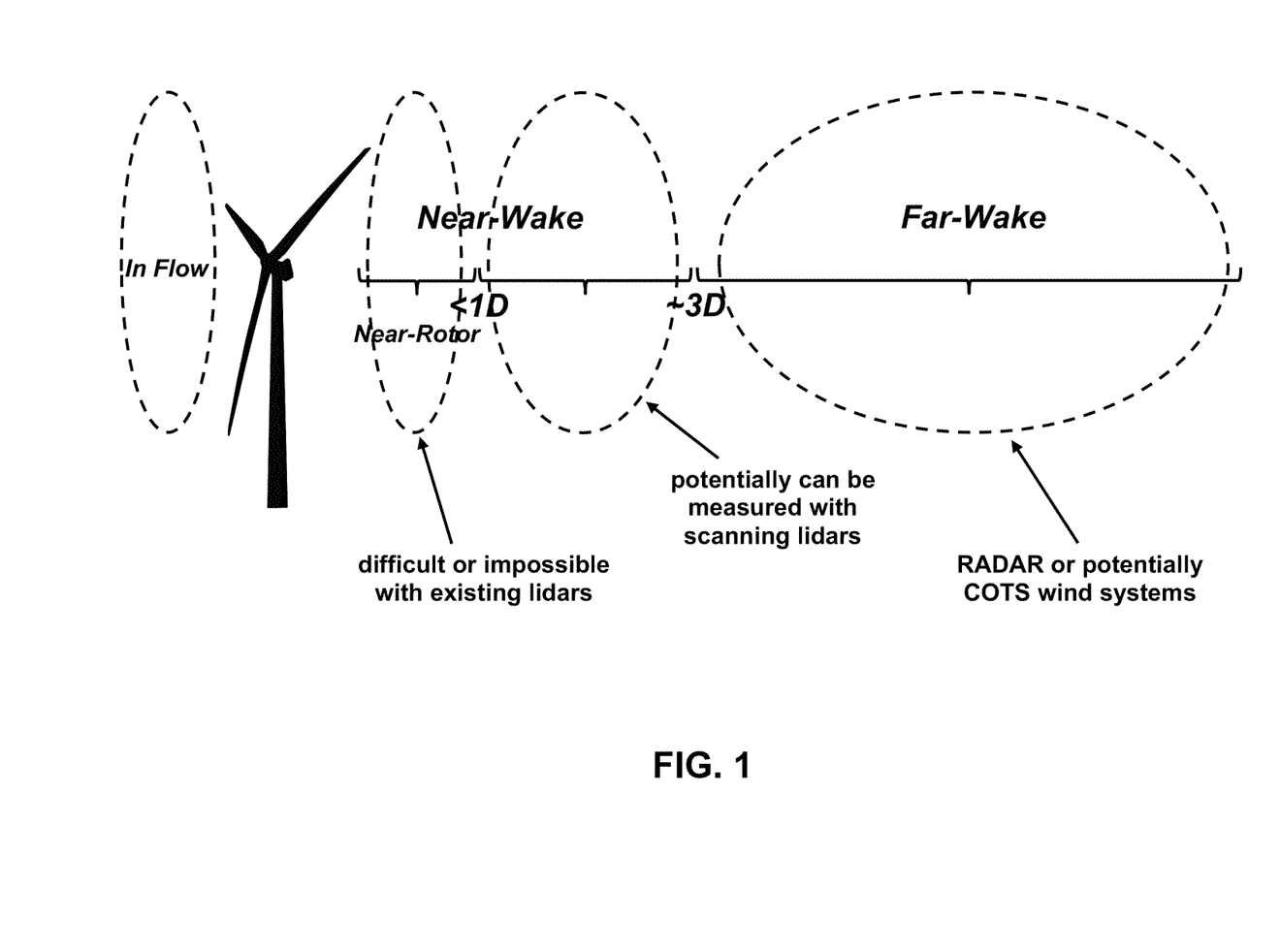
FIG. 1 is a schematic illustration of a wind turbine wake.

FIG. 1 is a schematic illustration of a wind turbine wake. The far-wake region (at a distance beyond about three rotor diameters (3D) downstream of the wind turbine) is characterized by wake meandering and merging of distinct airflows. In this far-wake region, the maximum wind velocity is about 10 m/s and features are about 1-10 meters in size. RADAR or potentially commercial off-the-shelf (COTS) lidar systems can measure wind velocity in this region. The near-wake region (less than 3D downstream) is characterized by vortices, turbulence, and wake depression. In this near-wake region, the required spatial resolution is about 10 cm to 1 m, with local velocities in excess of 10 m/s, limiting the total measurement time to much less than a second. Downstream distances from 1D to 3D can potentially be measured with existing scanning lidars. However, it is difficult or impossible to measure wake characteristics in the near-rotor region (within one rotor diameter downstream from the wind turbine) using existing lidars. Existing outdoor scanning lidar approaches are too slow to obtain high velocity wind flows in large volumes and typically provide poor range resolution. Wind-tunnel Doppler measurement techniques most often employ continuous wave (CW) lasers to produce sheets of light where scattering is obtained from seeded aerosols. These approaches present problems for wind turbine measurements due to unwanted background signal from the sun, range limitations, slow scanning of the laser sheet and the difficulty of seeding air flow on a large scale. Further, it is desired to obtain three orthogonal components of velocity at each range location to provide a three-dimensional velocity profile of the scene.

Therefore, a need remains for a remote sensing lidar that can measure high speed, vector wind velocities with good range resolution in the wake of a wind turbine.

SUMMARY OF THE INVENTION

The present invention is directed to an imaging Doppler lidar (IDL) comprising a laser transmitter that provides a pulsed, narrow linewidth laser light to flood illuminate a scene comprising aerosol particles moving at a velocity, a frequency discriminator for measuring the Doppler frequency shift of laser light scattered from the moving aerosol particles, and at least one imaging receiver for detecting the scattered laser light and having a variable gate delay at the repetition frequency of the laser transmitter for range-gating the detected scattered laser light. The laser transmitter preferably has a repetition rate of greater than 1 Hz and energy per pulse of greater than 10 mJ. The laser light preferably has a pulse width of less than 10 nanoseconds, a wavelength of between 300 and 1500 nanometers, and a linewidth of less than 200 MHz. For example, the laser can comprise a Q-switched solid-state laser, such as a Nd:YAG, Er:YAG, Er:glass, or Ho:YAG laser. The frequency discriminator preferably can discriminate a Doppler shift of the scattered laser light of less than 100 MHz. The frequency discriminator can comprise a single-edge spectral absorption filter, such as a gas absorption cell, that provides a wide field-of-view for imaging. The imaging receiver preferably has a gate width of less than 10 ns and can be on other than a line-of-sight with the laser transmitter. The receiver preferably comprises a focal plane array. Three or more receivers can provide a three-dimensional vector velocity image of the scene. The scene can be a wind wake downstream from a wind turbine.

The invention enables the measurement of the velocity distribution of a large volume, in parallel, and at high spatial resolution. High spatial resolution is afforded by the pulsed laser transmitter together with a gated, imaging receiver. The invention enables the measurement of small-scale features within high velocity flow fields over relatively large volumes, up close to turbine blades. Scattering can be obtained from naturally occurring aerosol particles, eliminating the necessity of seedling large volumes with artificial aerosols, as is usually the practice in wind tunnels. Furthermore, the wind velocity is measured directly from Doppler shifts of the laser light, so the measurement can be accomplished at large standoff and at wide fields-of-view. Because the IDL is non-scanning, it can measure the velocity distribution of a large area in parallel and can be much faster than conventional, coherent lidar scanning approaches. A three-dimensional image of the velocity distribution with high spatial resolution enables direct comparison with flow modeling.

BRIEF DESCRIPTION OF THE DRAWINGS

The detailed description will refer to the following drawings, wherein like elements are referred to by like numbers.

DETAILED DESCRIPTION OF THE INVENTION

Figure 2:
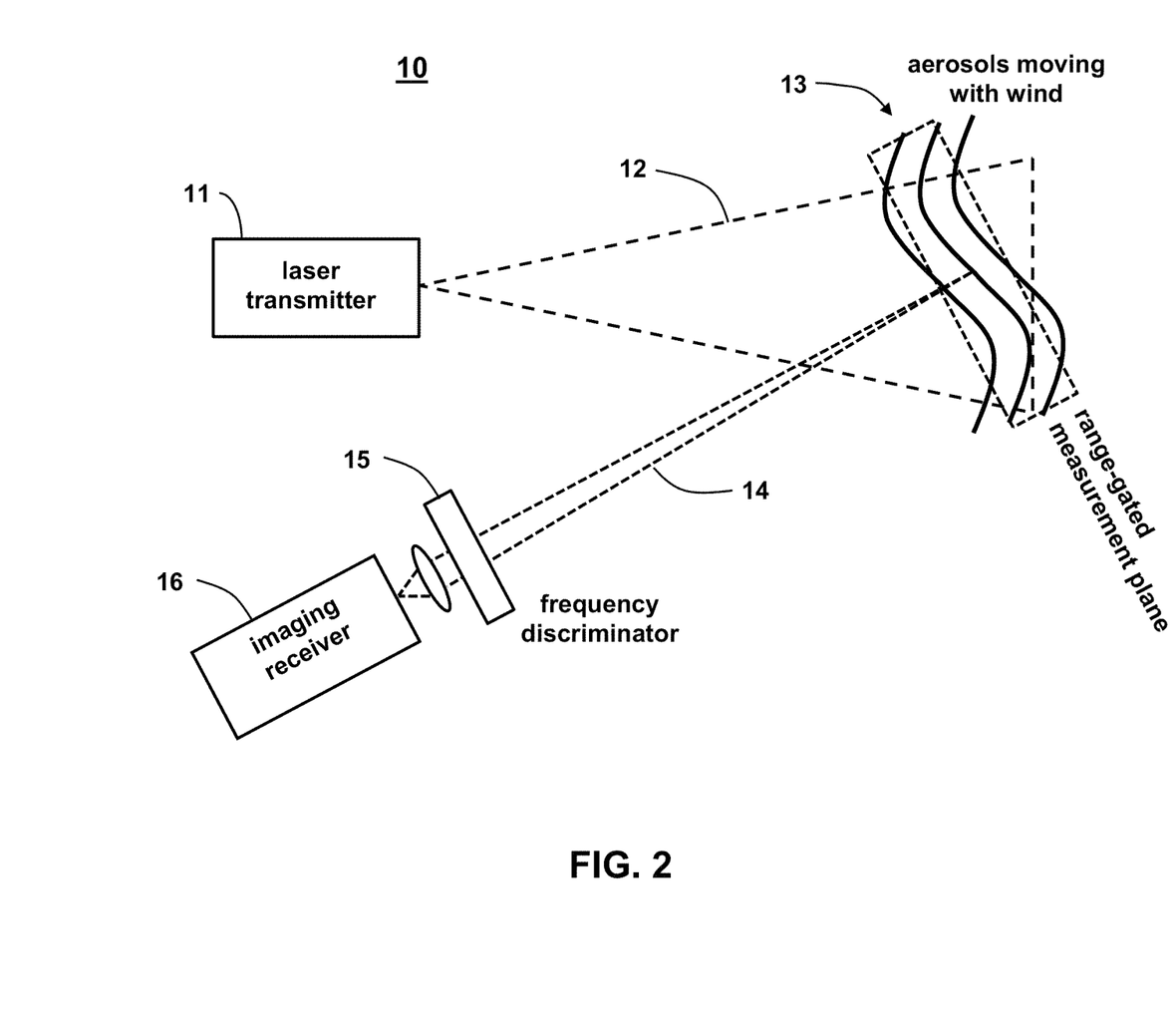
FIG. 2 is a schematic illustration of an imaging Doppler lidar (IDL).

The present invention is directed to an imaging Doppler lidar (IDL) system for the measurement of wind velocity for a variety of potential applications, including the measurement of complex flow dynamics from large-scale power generating wind turbines. FIG. 2 shows a schematic illustration of the imaging Doppler lidar system 10 of the present invention. The IDL 10 comprises a pulsed, narrow linewidth laser transmitter 11 to flood illuminate 12 a scene 13 and a time-gated imaging receiver 16 to provide range resolution and an image of the velocity field in a measurement plane of the scene 13. The velocity can be determined for each pixel in the image from the Doppler frequency shift of the scattered laser light 14 that can be measured through a frequency discriminator 15. The short optical pulses that illuminate the scene and the precise time-of-flight measurements of the pulse reflections from aerosols in the scene enable accurate distance information that provides the third spatial dimension normally absent when images are recorded using only ambient reflected light.

The laser transmitter 11 should have an adequate energy per pulse to provide sufficient signal-to-noise at the receiver, a high repetition rate to capture transient formations in the flow, and a large enough tuning range to locate a strong absorption feature of the frequency discriminating cell. While higher pulse energy is generally desirable for increasing the minimum detectable wind velocity, simulations indicate single pulse energies of order 100 mJ are reasonable. The pulse repetition frequency should be above about 10 Hz to avoid washing out high velocity flow patterns, but can be much higher when integrating signal directly on an intensified, charged coupled device (ICCD) camera. The laser pulse preferably has a pulse width of order 1 ns for sub-meter range resolution. The range resolution is determined from the mean of the pulse width and the receiver camera gate time, multiplied by the speed of light. Although the beam quality of the laser is not critical, the far-field pattern of the laser must be stable and relatively uniform. The laser light preferably has a wavelength of between 300 and 1500 nanometers and a narrow linewidth no more than 200 MHz to enable high resolution of small Doppler shifts. For example, the laser can comprise a Q-switched solid-state laser, such as a Nd:YAG, Er:YAG, Er:glass, or Ho:YAG laser.

Figure 3:
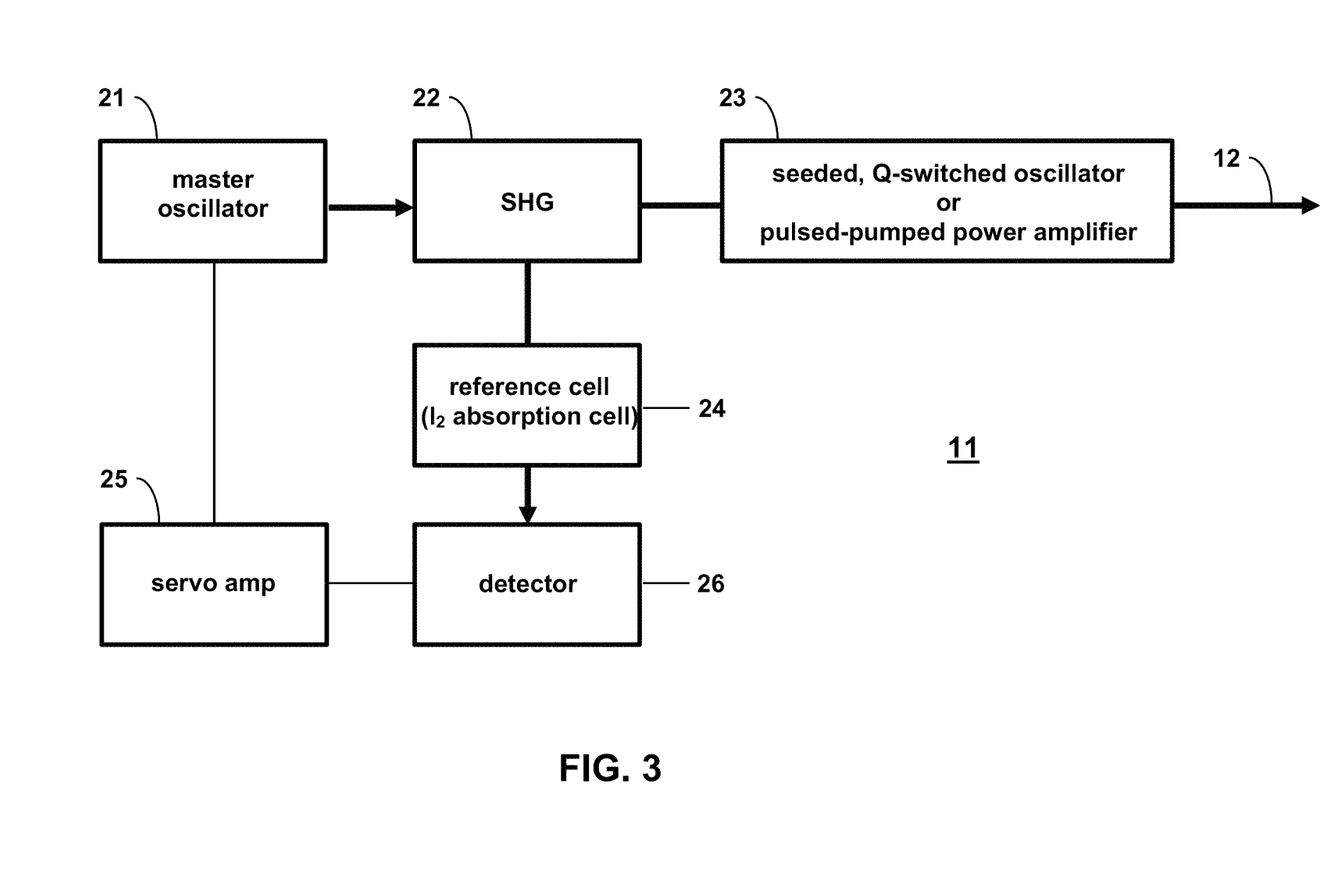
FIG. 3 is a block diagram of an exemplary narrow linewidth laser transmitter with frequency locking optics and electronics.

FIG. 3 is a block diagram of an exemplary laser transmitter 11. The master oscillator 21 can be a continuous wave source, providing a narrow linewidth emission that can be tuned to a desired absorption feature of a first reference cell 24 (e.g., an iodine absorption cell). The output of the master oscillator 21 can be frequency doubled by second harmonic generation (SHG) 22 and transmitted through the reference cell 24 to a detector 26. The transmitted light through the first reference cell 24 can be held at a constant level, thereby locking the master oscillator frequency to a spectral feature of the reference cell 24 using feedback from a servo amplifier 25. A portion of the frequency doubled light can be amplified 23 to a large energy level for illumination 12 of the target scene. This amplification can be accomplished in at least two ways. The first is to use the low-level continuous wave signal to seed a high-power Q-switched slave oscillator. In this way, the output of the slave oscillator will be made single frequency and follow the frequency of the slave laser. Alternately, the low level signal can be amplified using a series of pulse-pumped power amplifiers.

The imaging receiver 16 preferably comprises a time-gated focal plane array (FPA) that uses independent time-of-flight measurements at every pixel to acquire distance information for aerosols in the scene. For example, the FPA can have a gate width of about 1 ns, a frame rate matching the laser repetition frequency, a sensor size of greater than 256×256 pixels, and a pixel size of less than 25 microns. The gate turn-on delay can be varied from 1-100 ns, allowing on-the-fly variation of the measurement plane. Volumetric, vector velocity images can therefore be measured without employing beam steering optics. The system preferably has adequate sensitivity to be used with natural aerosol concentrations and cross-sections.

Figure 4:
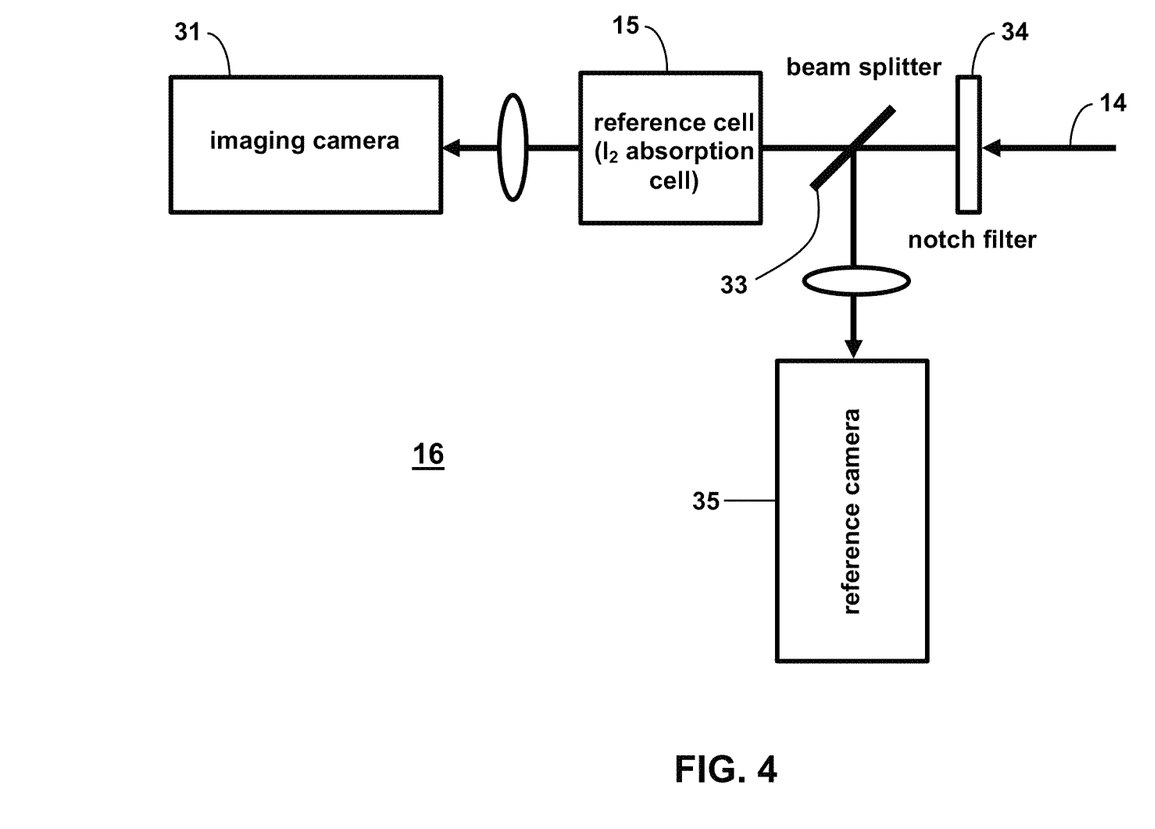
FIG. 4 is a block diagram of an exemplary imaging receiver.

FIG. 4 is a block diagram of an exemplary receiver 16 comprising signal and reference FPAs. Optics can be used to collect the scattered light 14 and image the target onto two ICCD focal plane arrays 31 and 35. A narrow bandpass filter 34 can be used to block sun light and background signals not at the laser wavelength. One of the ICCD cameras 35 can be used as a reference, imaging the scene directly reflected from a polarization independent beam splitter 33 to remove the effects of a non-uniform scattering distribution by ratioing the two signals. Light coupled to the other ICCD camera 31 passes through a second reference cell 15, which is the frequency discriminator for the system, provides the signal. Doppler shifted light experiences a change in transmission, which appears on the ICCD as a brighter or darker signal relative to an unshifted signal.

The frequency discriminator 15 can be a single-edge spectral absorption filter that preferably has a line width and absorption depth compatible with the velocity range of interest. The frequency discriminator should have a sufficiently large field-of-view, and have a relatively short length and large diameter. For example, for 532 nm laser emission, an iodine absorption cell can be used as the frequency discriminator. An iodine absorption cell is basically an evacuated glass container with a controlled vapor pressure of iodine gas within. The iodine concentration determines the absorption per unit length at the laser wavelength. The iodine absorption spectrum is a rich forest of deep, very narrow lines starting at about 480 nm and ending near 640 nm. The absorption spectrum provides a very stable reference spectrum superimposed on the scattered laser light being observed.

Figure 5:
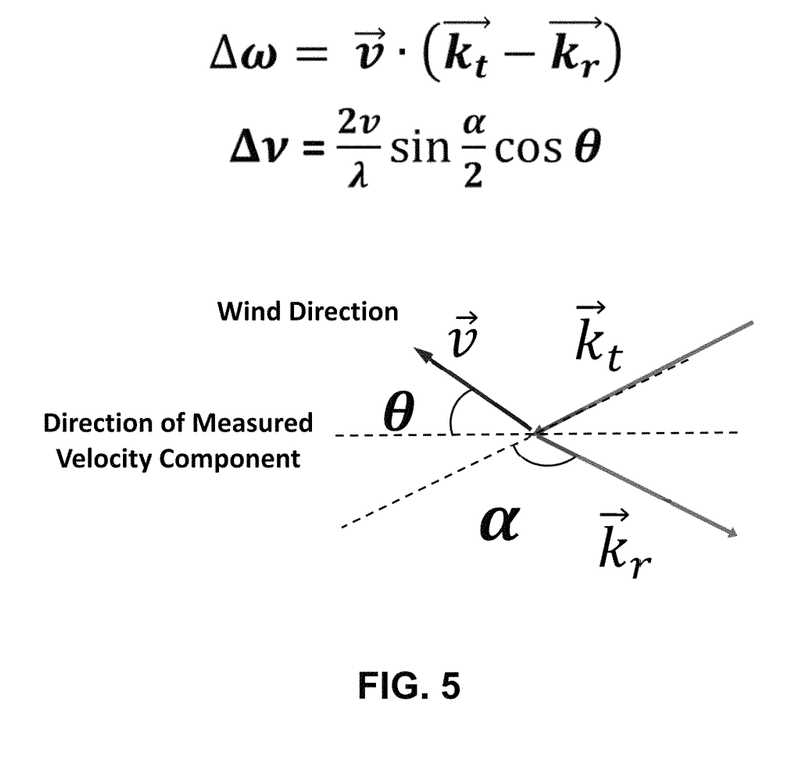
FIG. 5 is a schematic illustration of the scattering geometry at a target aerosol, giving the formula for the expected Doppler shift.

FIG. 5 shows the scattering geometry at the target aerosol at the scene. The measured velocity direction bisects the angle between the transmitter $\vec{k}_t$ and receiver $\vec{k}_r$ direction vectors, in the scattering plane. The Doppler shift $\Delta v$ is diminished by the cosine of the angle $\theta$ between the direction of the wind velocity $\vec{v}$ and the direction of the measured velocity component.

Figure 6:
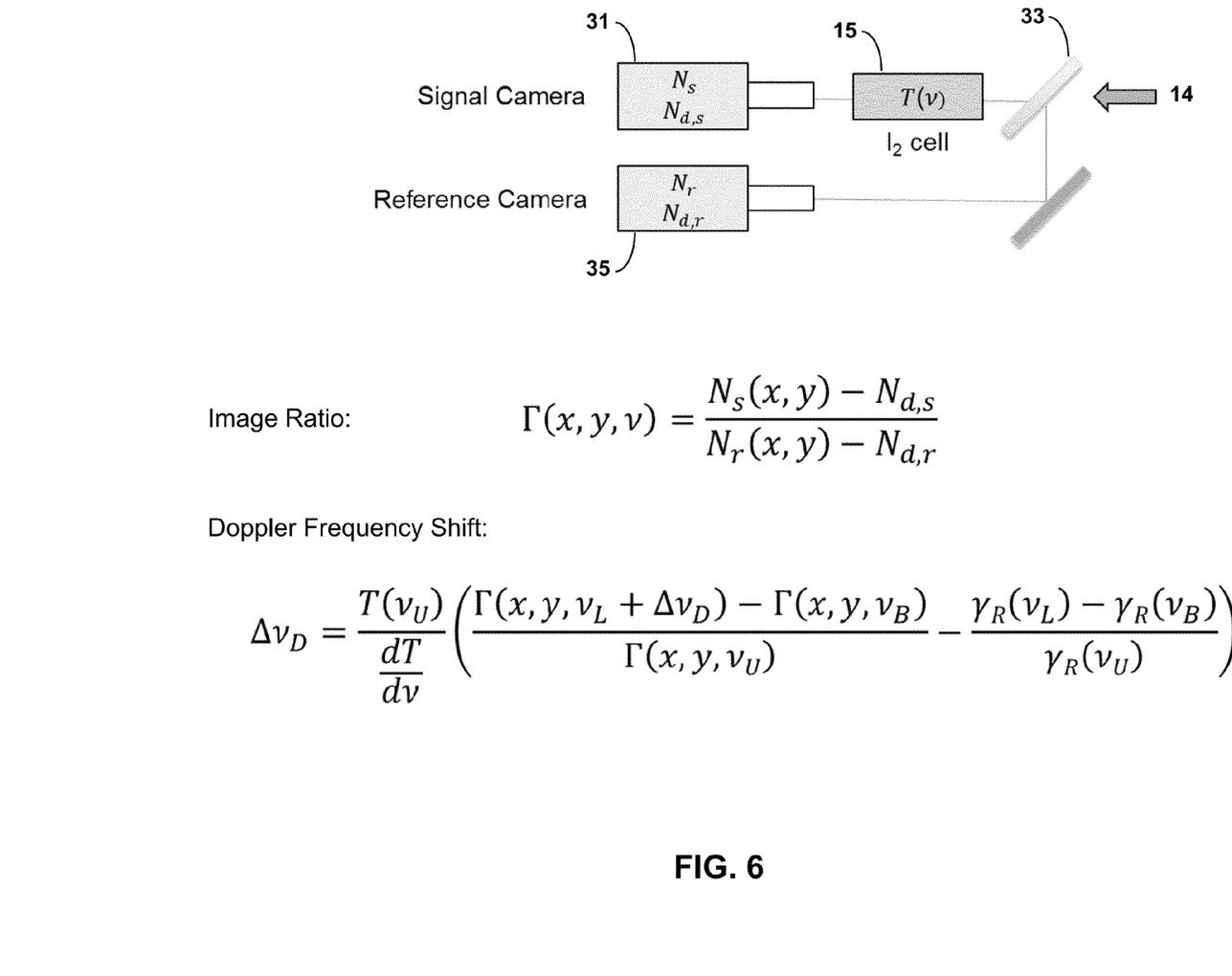
FIG. 6 shows a method to determine the velocity from camera images, using frequency discrimination that can be provided by an iodine absorption cell.

FIG. 6 shows a method to determine the velocity using frequency discrimination provided by an iodine absorption cell 15. Two cameras 31 and 35 (signal s and reference r, respectively) measure counts $N_s$ and $N_r$ per pixel proportional to the scattered light intensity at frequency v. After removing dark levels $N_{d,s}$ and $N_{d,r}$, the images are ratioed, pixel by pixel. Three ratio images $\Gamma(x, y, v_L)$, $\Gamma(x, y, v_U)$, and $\Gamma(x, y, v_B)$ are recorded at each pixel (x, y). The first is with the laser tuned to the 50% relative transmission point on the side of an absorption line of iodine, $v_L$, providing a measure of the change in transmission due to Doppler shifts of the scattered laser light. The second image is at a frequency of high transmission, $v_U$, well removed from the absorption line, which allows for correction of intensity variations in the image not associated with Doppler shifts. The third is also taken near the 50% transmission point, $v_B$, but is taken of a uniform, stationary scene without Doppler shifts. The last image allows for removal of spatial variations of laser frequency, if present. In addition, simultaneous transmission measurements using single detectors are taken from the first reference iodine cell (shown in FIG. 3) to correct for frequency drift of the laser during data collection. Ratios of these images are designated by $\gamma_R$ in the equation. T(v) is the transmission of the iodine cell at frequency v and dT/dv is the slope of the transmission line at the measurement frequency. The Doppler shift $\Delta v_D$ can be calculated, to first order, from the various ratio measurements using the equations in FIG. 6.

Figure 7:
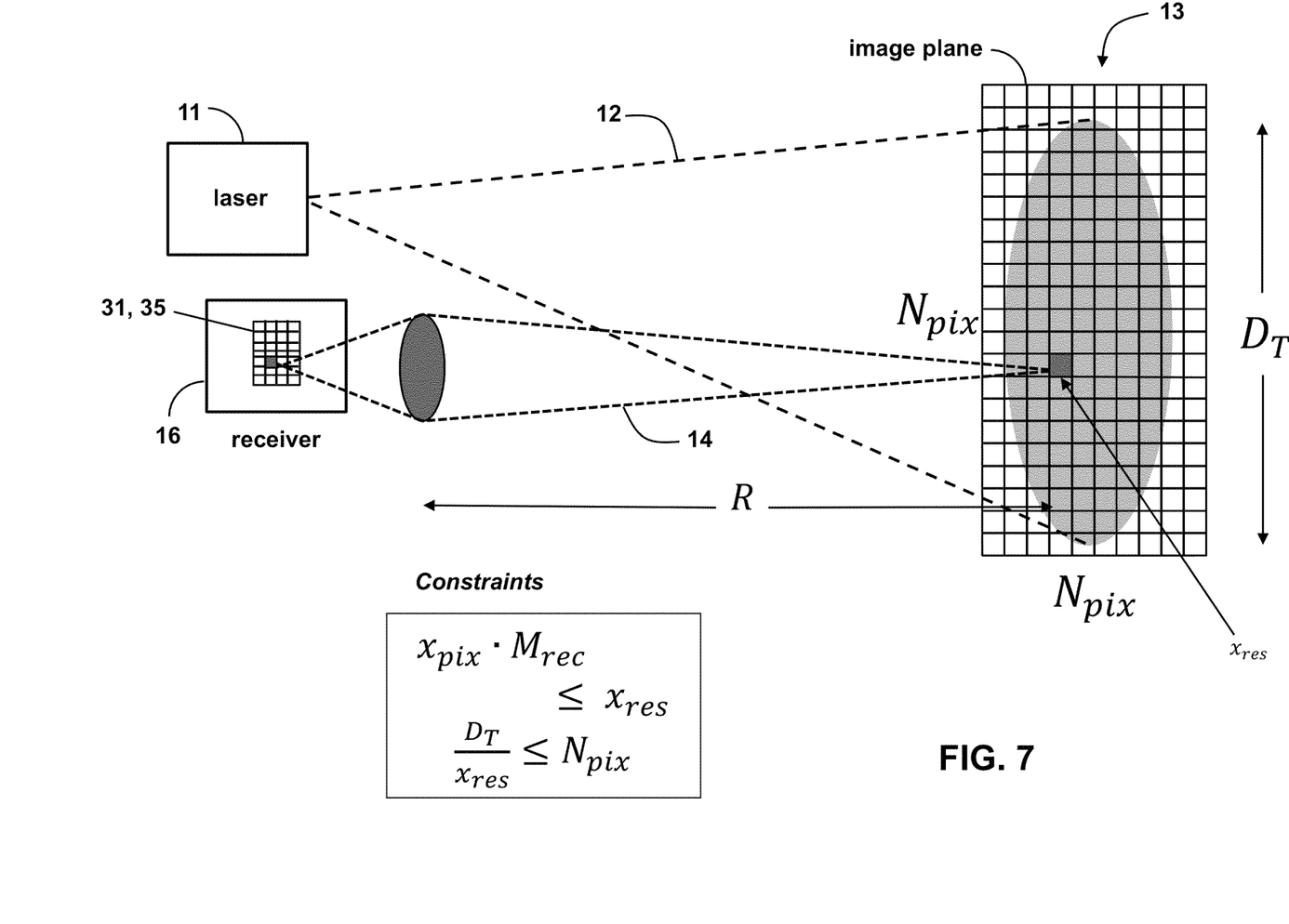
FIG. 7 is a schematic illustration of an imaging geometry.

FIG. 7 is a schematic illustration of the imaging geometry. The laser transmitter 11 illuminates a region of diameter $D_T$ at the image plane of the scene 13. Each FPA sensor 31 and 35 records an image of the same plane 13, with a one-to-one mapping of the sensor pixel size $x_{pix}$ to a resolution element of size $x_{res}$ in the image plane. The spatial resolution of the lidar system at the target plane is determined by the magnification $M_{rec}$ of the imaging system, number of pixels $N_{pix}$ in the FPA, and diameter $D_T$ of the illuminated area. For a given range R from the receiver 16 to the image plane, the spatial resolution $x_{res}$ is often in excess of what is required. It is advantageous to perform pixel binning on the camera to increase signal-to-noise at the expense of some spatial resolution. Radiometric calculations indicate that noise equivalent velocities below 1 m/s are achievable for a backscattering coefficient of about $\beta \sim 1 \times 10^{-4}$ $m^{-1}sr^{-1}$. This is consistent with aerosol particle densities in the 1-10 micron size of about 1000-5000 particles/$cm^3$.

Figure 8:
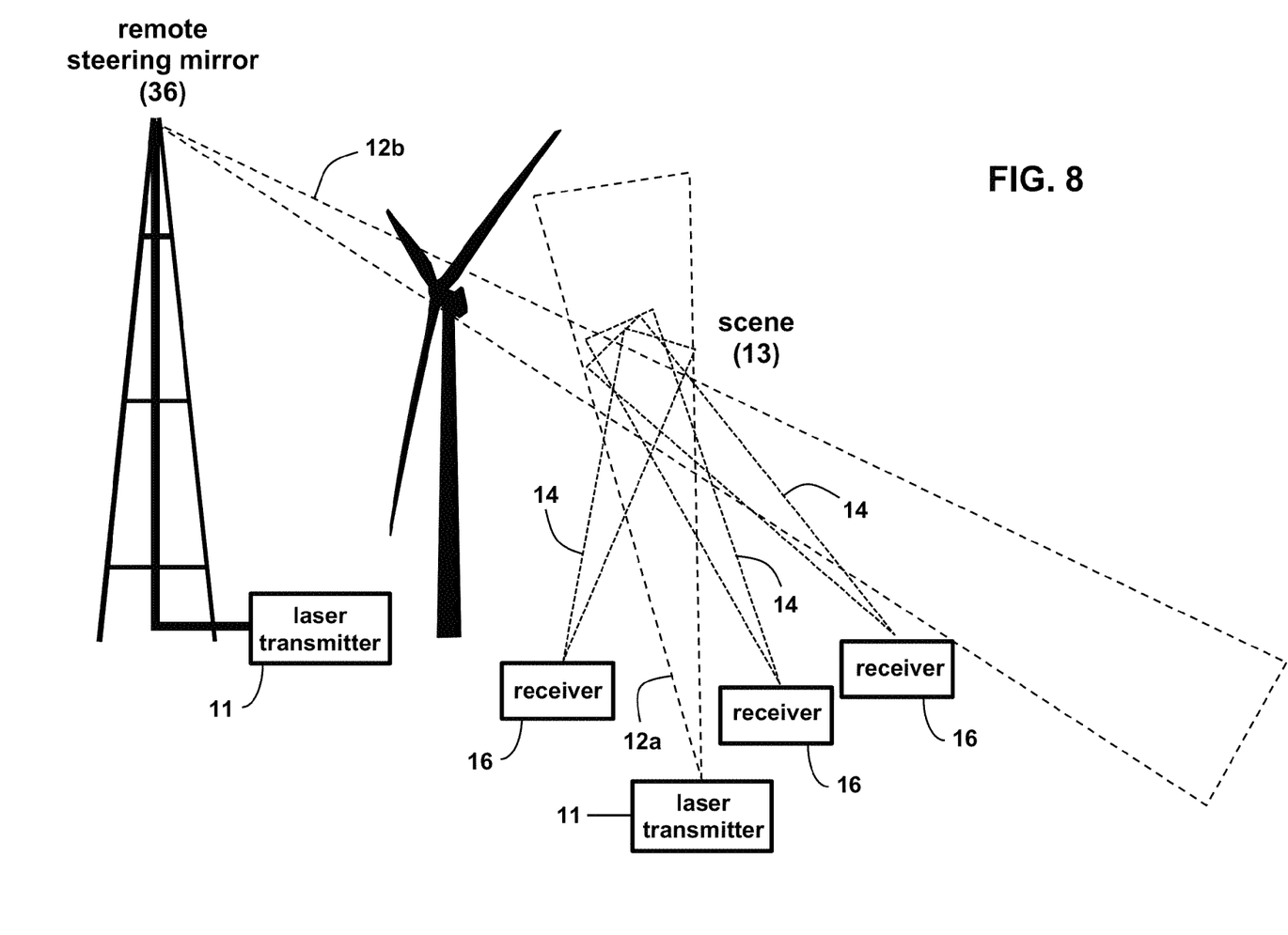
FIG. 8 is a schematic illustration of a full scale implementation of an IDL system to profile the wind velocity in a wind turbine wake.

FIG. 8 is a schematic illustration of a full scale implementation of an IDL system. The laser transmitter 11 can be ground based and the laser beam can be directed upwards 12a or steered 12b to the desired scene 13 using a tower-mounted remote steering mirror 36. In the latter case, the ground can be used as a backstop for the laser illumination. Multiple receivers 16 can be located at ground locations to provide a three-dimensional, vector image of the wind velocity field in the scene 13.

The present invention has been described as an imaging Doppler lidar. It will be understood that the above description is merely illustrative of the applications of the principles of the present invention, the scope of which is to be determined by the claims viewed in light of the specification. Other variants and modifications of the invention will be apparent to those of skill in the art.

I claim:

1. An imaging Doppler lidar, comprising:
   a laser transmitter that provides a pulsed, narrow linewidth laser light to flood illuminate a scene comprising aerosol particles moving at a velocity,
   a frequency discriminator for measuring the Doppler frequency shift of laser light scattered from the moving aerosol particles, and
   at least one imaging receiver for detecting the scattered laser light and having a variable gate delay at the repetition frequency of the laser transmitter for range-gating the detected scattered laser light.

2. The imaging Doppler lidar of claim 1, wherein the laser transmitter has a repetition rate of greater than 1 Hz.

3. The imaging Doppler lidar of claim 1, wherein the laser transmitter comprises a Q-switched solid-state laser.

4. The imaging Doppler lidar of claim 1, wherein the laser light has a pulse width of less than 10 nanoseconds.

5. The imaging Doppler lidar of claim 1, wherein the laser light has a wavelength of between 300 and 1500 nanometers.

6. The imaging Doppler lidar of claim 1, wherein the laser light has a linewidth of less than 200 MHz.

7. The imaging Doppler lidar of claim 1, wherein the frequency discriminator can discriminate a Doppler frequency shift of the scattered laser light of less than 100 MHz.

8. The imaging Doppler lidar of claim 1, wherein the frequency discriminator comprises a single-edge spectral absorption filter.

9. The imaging Doppler lidar of claim 1, wherein the frequency discriminator comprises a gas absorption cell.

10. The imaging Doppler lidar of claim 1, wherein the at least one imaging receiver has a gate width of less than 10 ns.

11. The imaging Doppler lidar of claim 1, wherein the at least one imaging receiver is not on a line-of-sight with the laser transmitter.

12. The imaging Doppler lidar of claim 1, wherein the at least one imaging receivers comprises at least three imaging receivers, thereby providing a vector velocity image of the scene.

13. The imaging Doppler lidar of claim 1, wherein the at least one imaging receiver comprises a focal plane array.

14. The imaging Doppler lidar of claim 1, wherein the scene comprises a wind wake downstream from a wind turbine.

* * * * *